United States Patent
Kerner et al.

(10) Patent No.: US 7,859,795 B2
(45) Date of Patent: Dec. 28, 2010

(54) OUTER ACTUATOR ARM CONSTRAINED LAYER DAMPERS

(75) Inventors: Jeffrey Kerner, San Jose, CA (US); Manoj B. Keshavan, San Jose, CA (US); Robert C. Reinhart, San Jose, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 789 days.

(21) Appl. No.: 11/824,166

(22) Filed: Jun. 28, 2007

(65) Prior Publication Data
US 2009/0002894 A1 Jan. 1, 2009

(51) Int. Cl.
*G11B 21/16* (2006.01)
(52) U.S. Cl. .................................. 360/244.9
(58) Field of Classification Search ............... 360/265.9
See application file for complete search history.

(56) References Cited

U.S. PATENT DOCUMENTS

| | | | |
|---|---|---|---|
| 4,760,478 A | 7/1988 | Pal et al. | |
| 5,187,625 A | 2/1993 | Blaeser et al. | |
| 5,606,477 A | 2/1997 | Erpelding et al. | |
| 5,761,184 A | 6/1998 | Dauber et al. | |
| 5,771,135 A | 6/1998 | Ruiz et al. | |
| 5,796,553 A | 8/1998 | Tangren | |
| 5,875,072 A | 2/1999 | Brooks, Jr. et al. | |
| 6,005,750 A | 12/1999 | Willard et al. | |
| 6,271,996 B1 | 8/2001 | Houk et al. | |
| 6,411,472 B1 | 6/2002 | Allsup | |
| 6,697,225 B2 * | 2/2004 | Wittig et al. | 360/244.9 |
| 6,704,157 B2 * | 3/2004 | Himes et al. | 360/75 |
| 6,731,465 B2 * | 5/2004 | Crane et al. | 360/244.3 |
| 6,771,466 B2 | 8/2004 | Kasajima et al. | |
| 6,775,104 B2 * | 8/2004 | Hong et al. | 360/244.1 |
| 6,879,466 B1 | 4/2005 | Oveyssi et al. | |
| 6,937,444 B1 * | 8/2005 | Oveyssi | 360/265.8 |
| 6,982,852 B2 | 1/2006 | Nagahiro et al. | |

(Continued)

FOREIGN PATENT DOCUMENTS

JP    2000336971    12/2000

(Continued)

OTHER PUBLICATIONS

Harrison, et al., "Combined Tuned & Constrained Layer Damping of a Type 13 Magnetic Recording Head Suspension", *IEEE Transactions on Magnetics*, vol. 29, No. 6, Nov. 1993, 4098-4100.

(Continued)

*Primary Examiner*—Mark Blouin

(57) ABSTRACT

Outer arm constrained layer dampers to improve actuator dynamics are disclosed. One embodiment provides a housing and disk pack mounted to the housing and having a plurality of disks that are rotatable relative to the housing. In addition, an actuator is coupled to the housing, the actuator having a plurality of suspensions arms for reaching over the plurality of disks. A first damper is coupled with an outside (or inside) portion of a top outside suspension arm of the plurality of suspensions arms. In addition, a second damper is coupled with an outside (or inside) portion of a bottom suspension arm of the plurality of suspensions arms. In so doing, vibration modes involving deformation of the top suspension arm and the bottom suspension arm are damped.

20 Claims, 5 Drawing Sheets

U.S. PATENT DOCUMENTS

| | | |
|---|---|---|
| 7,085,108 B1 | 8/2006 | Oveyssi et al. |
| 7,145,749 B2 * | 12/2006 | Zuo et al. ................ 360/97.02 |
| 7,224,554 B2 * | 5/2007 | Wright .................... 360/244.3 |
| 7,545,607 B2 * | 6/2009 | Shimizu et al. .......... 360/265.7 |
| 7,551,400 B2 * | 6/2009 | Renken et al. ........... 360/244.9 |
| 7,636,222 B1 * | 12/2009 | Dobosz et al. ........... 360/265.9 |
| 7,697,240 B2 * | 4/2010 | Funabashi et al. ........ 360/265.9 |
| 7,701,672 B2 * | 4/2010 | Zeng et al. ............... 360/244.9 |
| 2003/0202284 A1 | 10/2003 | Arya |
| 2005/0094311 A1 | 5/2005 | Boss et al. |
| 2005/0135013 A1 | 6/2005 | Sassine et al. |
| 2006/0176617 A1 | 8/2006 | Kido et al. |

FOREIGN PATENT DOCUMENTS

| | | |
|---|---|---|
| JP | 2005149577 | 6/2005 |

OTHER PUBLICATIONS

Ro, et al., "Optimum Design and Control of Partial Active Constrained Layer Damping Treatments", *Mechanical Engineering Department, The Catholic University of America*, Washington, DC., 2004, (2006),4183-4187.

Henze, Dick et al., "Effects of Constrained-Layer Damping on the Dynamics of a Type 4 In-Line Head Suspension", *IEEE Transactions on Magnetics*, vol. 26, No. 5, Sep. 1990, 2439-2441.

* cited by examiner

225

350

400

---

RECEIVE AN ACTUATOR COMPRISING A PLURALITY OF SUSPENSIONS ARMS FOR REACHING OVER A DISK PACK.
402

↓

COUPLE ONLY A FIRST DAMPER AND A SECOND DAMPER TO THE PLURALITY OF SUSPENSION ARMS, WHEREIN THE FIRST DAMPER IS COUPLED WITH A PORTION OF A TOP OUTSIDE SUSPENSION ARM OF THE PLURALITY OF SUSPENSIONS ARMS AND THE SECOND DAMPER IS COUPLED WITH A PORTION OF A BOTTOM SUSPENSION ARM OF THE PLURALITY OF SUSPENSIONS ARMS
404

↓

UTILIZE THE FIRST DAMPER AND THE SECOND DAMPER TO DAMPEN VIBRATION MODES FOR THE PLURALITY OF SUSPENSION ARMS THEREBY IMPROVING ACTUATOR DYNAMICS.
406

FIG. 4

OUTER ACTUATOR ARM CONSTRAINED LAYER DAMPERS

TECHNICAL FIELD

The present invention relates to the field of hard disk drive development, and more particularly to a method and system for utilizing outer arm constrained layer dampers for a multi-platter hard disk drive to improve actuator dynamics.

BACKGROUND ART

Hard disk drives (HDD) are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm with a suspended slider is utilized to reach out over the disk. The slider is coupled with a suspension that supports both the body of the slider and a head assembly that has a magnetic read/write transducer or head or heads for reading/writing information to or from a location on the disk. The complete head assembly, e.g., the suspension, slider, and head, is called a head gimbal assembly (HGA).

In operation, the hard disk is rotated at a set speed via a spindle motor assembly having a central drive hub. There are tracks at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), Moving Picture Experts Group audio layer 3 (MP3) players, and the like. For example, the original hard disk drive had a disk diameter of 24 inches. Modern hard disk drives are much smaller and include disk diameters of less than 2.5 inches. Advances in magnetic recording are also primary reasons for the reduction in size.

Generally, the small drives have small components with very narrow tolerances. For example, disk drive sliders are designed to fly in very close proximity to the disk surface. For instance, in some systems the slider may be designed to fly only three to five nanometers above the disk surface. Due to the tight tolerances, any vibration activity that is realized anywhere on the entire actuator arm, can deleteriously affect the performance of the HDD. For example, vibration of the actuator can result in variations in the magnetic spacing between the head element and media.

In addition, as disk drive track per inch (TPI) increases, sensitivity to small vibrations also increases. That is, small vibrations can cause large off-track and hence degraded performances. For example, in many cases, the variations in the magnetic spacing between the head element and media, the off-track issues and the increase in TPI are likely to cause data errors—both hard errors during writing and soft errors during reading. Moreover, vibration induced errors become even more apparent as the actual offset distances and overall components are reduced in size.

SUMMARY

Outer arm constrained layer dampers to improve actuator dynamics are disclosed. One embodiment provides a housing and disk pack mounted to the housing and having a plurality of disks that are rotatable relative to the housing. In addition, an actuator is coupled to the housing, the actuator having a plurality of suspensions arms for reaching over the plurality of disks. A first damper is coupled with an outside (or inside) portion of a top suspension arm of the plurality of suspensions arms. In addition, a second damper is coupled with an outside (or inside) portion of a bottom suspension arm of the plurality of suspensions arms. In so doing, vibration modes of the top suspension arm the bottom suspension arm are damped.

BRIEF DESCRIPTION OF THE DRAWINGS

FIG. 4 is a flowchart of a method for utilizing outer arm constrained layer dampers to improve actuator dynamics in accordance with one embodiment of the present invention.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a hard disk drive and components connected therewith. The discussion will then focus on embodiments of a method and system for utilizing outer arm constrained layer dampers to improve actuator dynamics, such as, vibration modes caused by arm sway, arm-torsion and outer arm bending in particular.

Overview

Figure 1A:
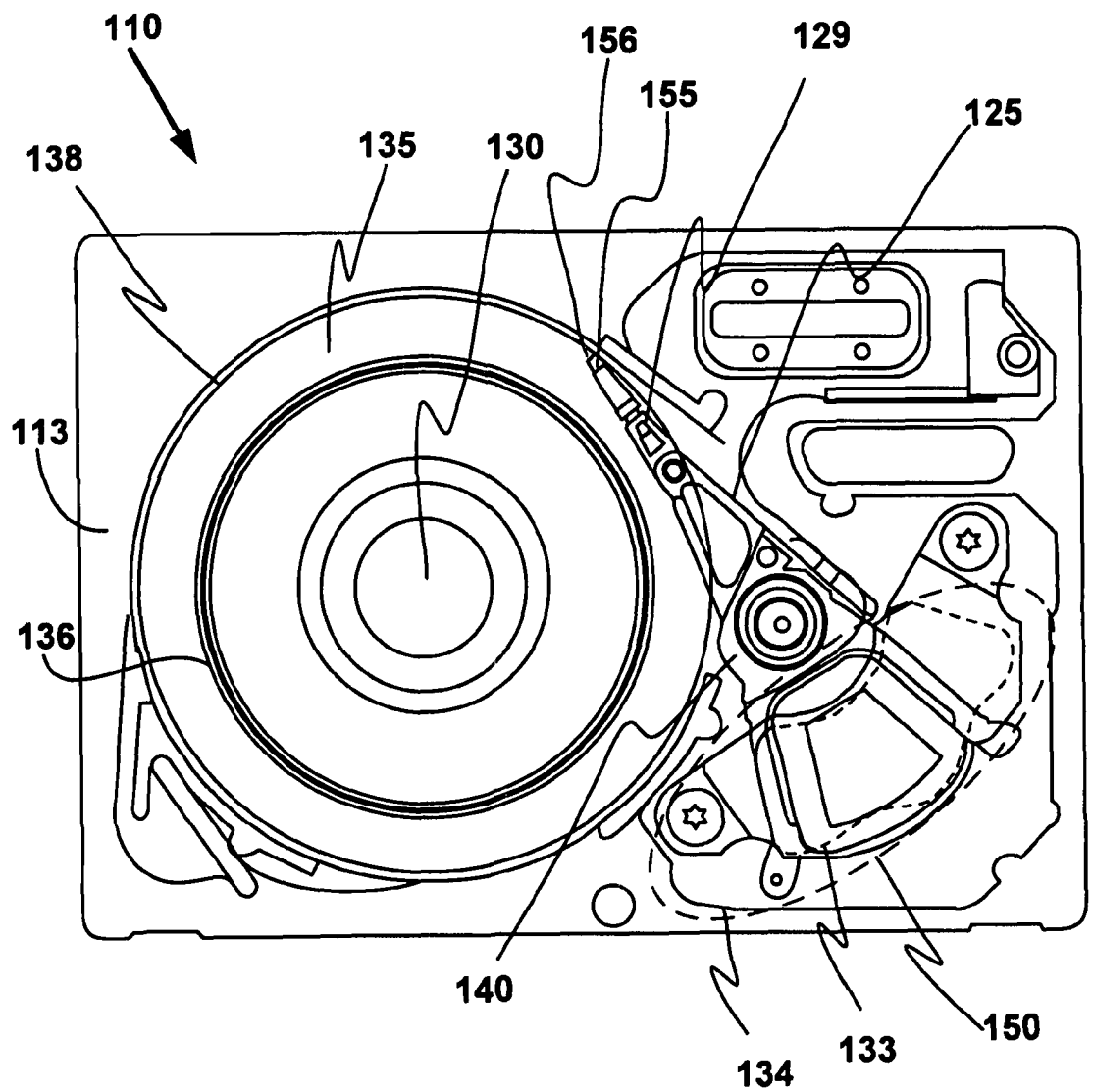
FIG. 1A is a plan view of an HDD with cover and top magnet removed in accordance with one embodiment of the present invention.
Figure 1B:
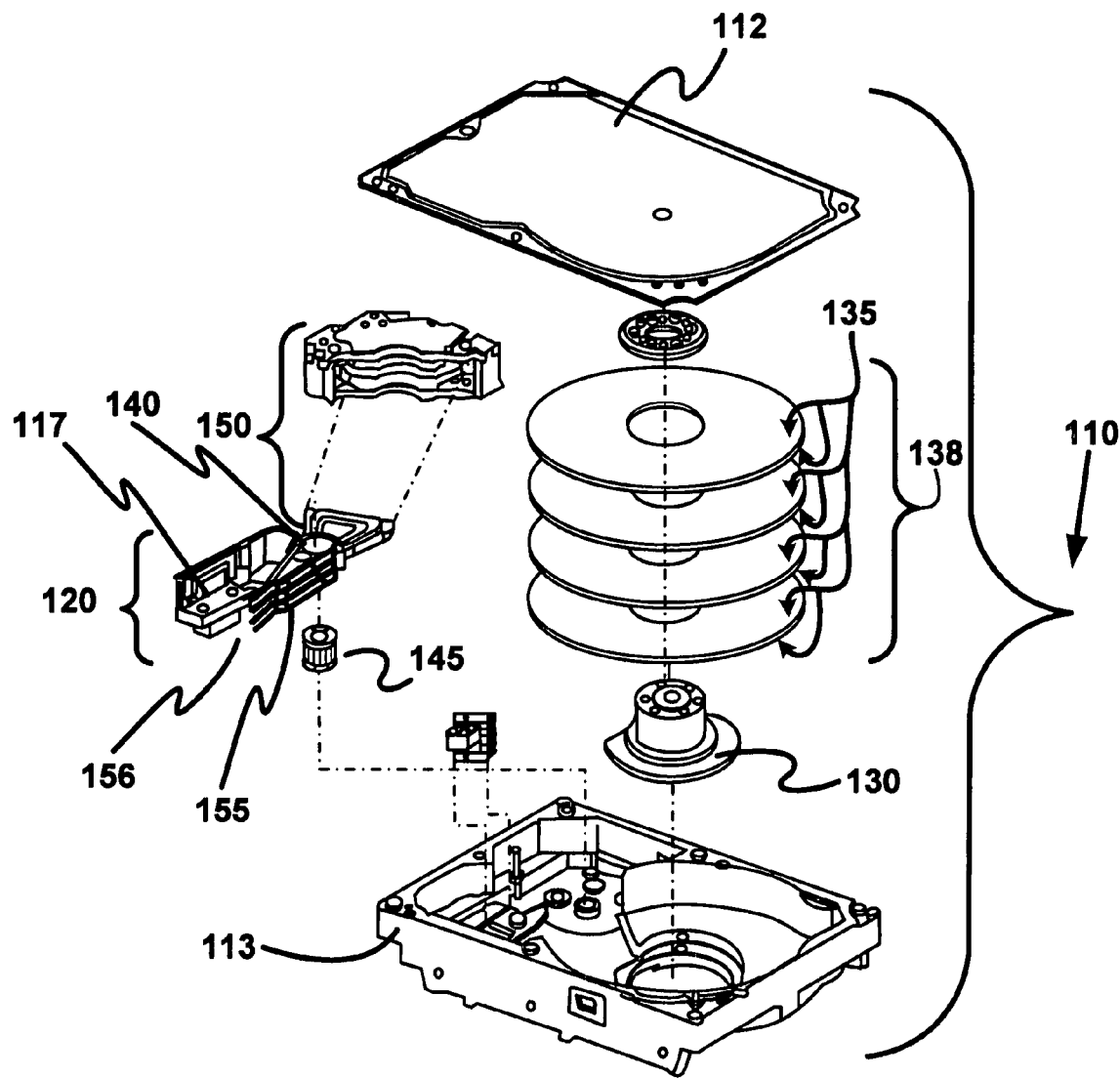
FIG. 1B is an isometric blow-apart of an HDD in accordance with one embodiment of the present invention.

In general, the HDD comb (also referred to as an E-block) serves as a platform on which the suspensions (compliant members containing sliders with recording heads) are mounted. The recording heads fly at a constant height (on the order of nanometers) above the disk surface tracking pre-written servo information. An HDD carriage assembly (as shown in FIGS. 1A and 1B) forms the primary motive mechanical system that enables a disk-drive to randomly access data to be written or recorded on the disk surfaces. An ideal carriage assembly would consist of a frictionless pivot bearing in conjunction with a perfectly rigid comb and a suspension system that provides the required compliance for the slider in pitch and roll, but is infinitely stiff otherwise. However, an ideal carriage is not feasible and to that degree, HDD performance and track density are limited by the dynamics of the motive mechanical system.

However, the present method and apparatus for utilizing outer arm constrained layer dampers to improve actuator dynamics addresses the means to damp out vibration modes associated with arm-sway, arm-torsion & outer arm-bending.

In general, arm-sway modes are a family of modes (each with a different phase relationship between individual arm motions) that are big detractors to track-MisRegistration (TMR). The dominant motion of the sway modes is in the cross-track direction and therefore directly translates to off-track motion of the head. This is distinctly different from bending modes that couple to off-track motion through skew at a given track. Arm sway modes can be excited either by air-flow during the track-follow mode of the actuator, resulting in increased NRRO, or during the process of the carriage seeking between two tracks resulting in Random Transient Vibration (RTV). Arm torsion mode shapes exhibit significant twisting of the arms superposed on sway motion. The TMR issues from arm torsion are similar to those from arm-sway. That is, the ability of the servo system to mitigate the effects of arm sway and arm torsion modes is limited due to the high frequencies of these modes (higher than the servo closed-loop band-width) and by the fact that these modes are excited during seeks that saturate the VCM driver.

The present technology described herein, provides a low-cost and effective solution to damp out high frequency arm modes such as arm-sway, arm-torsion & arm-bending modes by utilizing constrained layer arm dampers (CLD) on the outer arms of an actuator comb. The E-block arms are designed in a manner such that the dominant arm vibration modes (sway and torsion) have a significant percentage of their strain energy associated with the deformation of outer arms. Hence, by the use of CLDs exclusively on the end-arms, the benefit from damping is realized on all the arms, in that all the arm sway & torsion modes are damped in addition to reduction in outer-arm bending mode related TMR. Moreover, the described benefits are realized with minimal modification to the overall HDD manufacturing process and to the actuator structure.

Operation

With reference now to FIG. 1A, a schematic drawing of one embodiment of an information storage system including a magnetic hard disk file or drive 110 for a computer system is shown. Hard disk drive 110 has an outer housing or base 113 containing a disk pack having at least one media or magnetic disk 138. The disk pack (as represented by disk 138) defines an axis of rotation and a radial direction relative to the axis in which the disk pack is rotatable.

A spindle motor assembly having a central drive hub 140 operates as this axis and rotates the disk 138 or disks of the disk pack in the radial direction relative to housing 113. An actuator 120 includes a plurality of parallel actuator arms 125 in the form of a comb that is movably or pivotally mounted to base/housing 113 about a pivot assembly 140. A controller 150 is also mounted to base 113 for selectively moving the comb of arms relative to the disk pack (as represented by disk 138).

In the embodiment shown in FIG. 1A, each arm 125 has extending from it at least one cantilevered integrated lead suspension (ILS) 129. The ILS 129 may be any form of lead suspension that can be used in a data access storage device, such as a hard disk drive (HDD). The slider 155 is usually bonded to the end of ILS 129. The level of integration containing the slider, suspension, ILS, and read/write head (not shown) is called the Head Gimbal Assembly (HGA).

The ILS 129 has a spring-like quality, which biases or presses the air-bearing surface of slider 155 against disk 138 to cause slider 155 to fly at a precise distance from disk 138. ILS 129 has a hinge area that provides for the spring-like quality, and a flexing interconnect that supports read and write traces and electrical connections through the hinge area. A voice coil 133, free to move within a conventional voice coil motor magnet assembly 134 (top pole not shown), is also mounted to actuator arms 125 opposite the head gimbal assemblies. Movement of the actuator 150 by controller 140 causes the head gimbal assemblies to move along radial arcs across tracks on the surface 135 of disk. The head gimbal assemblies operate in a conventional manner and always move in unison with one another, unless drive 110 uses multiple independent actuators (not shown) wherein the arms can move independently of one another.

FIG. 1B shows a similar HDD 110, but with all its components in an isometric blow-apart view. The components, such as the plurality of hard disks in a disk stack 138, are assembled into base casting 113, which provides coupling points for components and sub-assemblies such as disk stack 138, voice coil motor (VCM) 150, and actuator assembly 120. Disk stack 138 is coupled to base casting 113 by means of motor-hub assembly 130. Motor hub assembly 130 will have at least one disk 158 coupled to it whereby disk 158 can rotate about an axis common to motor-hub assembly 130 and the center of disk 158. Disk 158 has at least one surface 135 upon which reside data tracks 136. Actuator assembly 120 includes in part connector 117, which conveys data between arm electronics and a host system wherein HDD 110 resides.

Actuator assembly 120 is coupled pivotally to base casting 113 by means of pivot bearing 145, whereby VCM 150 can move head 156 accurately across data tracks 136. Upon assembly of actuator assembly 120, disk stack 138, VCM 150, and other components with base casting 113, cover 112 is coupled to base casting 113 to enclose these components and sub-assemblies into HDD 110.

Data is recorded onto disk surface 135 in a pattern of concentric rings known as data tracks 136. Disk surface 135 is spun at high speed by means of a motor-hub assembly 130. Data tracks 136 are recorded onto disk surface 135 by means of magnetic head 156, which typically resides at the end of slider 155. FIG. 1A being a plan view shows only one head and one disk surface combination. One skilled in the art understands that what is described for one head-disk combination applies to multiple head-disk combinations. The embodied invention is independent of the number of head-disk combinations.

The dynamic performance of HDD 110 is a major mechanical factor for achieving higher data capacity as well as for manipulating this data faster. The quantity of data tracks 136 recorded on disk surface 135 is determined partly by how well magnetic head 156 and a desired data track 136 can be positioned to each other and made to follow each other in a stable and controlled manner. There are many factors that will influence the ability of HDD 110 to perform the function of positioning magnetic head 156, and following data track 136 with magnetic head 156. In general, these factors can be put into two categories; those factors that influence the motion of magnetic head 156; and those factors that influence the motion of data track 136. Undesirable motions can come about through unwanted vibration and undesirable tolerances of components. Herein, attention is given to vibration relating to actuator 120.

Figure 2A:
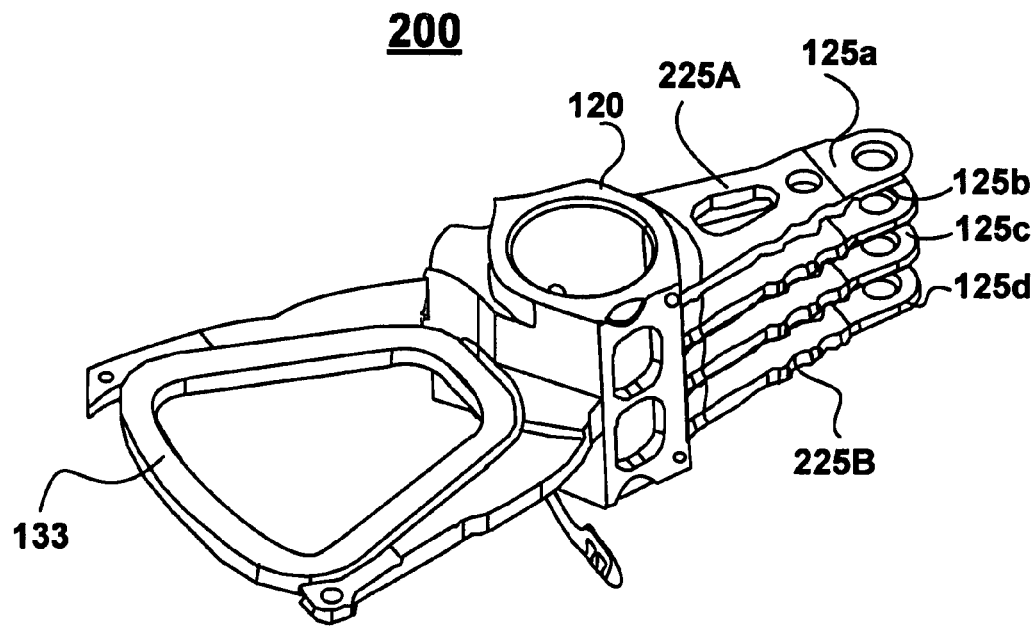
FIG. 2A is an isometric view of the actuator assembly including a plurality of parallel actuator arms in the form of a comb in accordance with one embodiment of the present invention.

Referring now to FIG. 2A is an isometric view of the actuator assembly 120 including a plurality of parallel actuator arms 125a-125d in the form of a comb 212 in accordance with one embodiment of the present invention. In general, actuator 120 includes an actuator voice coil 133 and an actuator comb 212 including a plurality of suspension arms 125a-125d. Although 4 suspension arms 125 are shown, it is appreciated that the actuator comb 212 may include any number of suspension arms. Moreover, the present technology is independent of the actual number of suspension arms 125.

In addition, actuator assembly 120 includes two constrained layer dampers (referred to herein as dampers 225). A first damper 225t is associated with the top suspension arm 125a and a second damper 225b is associated with the bottom suspension arm 125d. For example, first damper 225t is mounted on the outside (or inside) portion of the top suspension arm 125a and second damper 225b is mounted on the outside (or inside) portion of the bottom suspension arm 125d. In one embodiment, actuator 120 is manufactured in the usual manner with the only modification being the addition of first damper 225t and second damper 225b to the designated outside suspension arms 125.

Figure 2B:
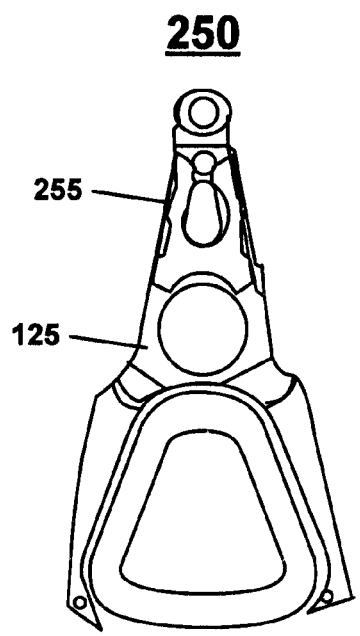
FIG. 2B is a top view of the actuator assembly, including a constrained layer damper having a first shape, in accordance with one embodiment of the present invention.

FIG. 2B is a top view of the actuator assembly, including a constrained layer damper 225 having a first shape, in accordance with one embodiment of the present invention. In one embodiment, constrained layer damper 225 is shaped to form-fit at least a portion of the actuator arm 125. In other words, the shape of constrained layer damper 225 follows the shape of actuator arm 125 to maximize the damping effectiveness of constrained layer damper 225.

Figure 2C:
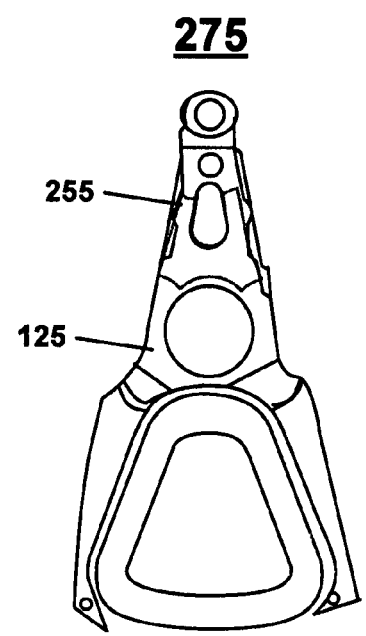
FIG. 2C is a top view of the actuator assembly, including a constrained layer damper having a second shape, in accordance with one embodiment of the present invention.

FIG. 2C is a top view of the actuator assembly, including a constrained layer damper 225 having a second shape, in accordance with one embodiment of the present invention. In one embodiment, constrained layer damper 225 may be somewhat smaller than, but still follow the shape of, actuator arm 125 to account for dimensional tolerances, to accommodate manufacturing tooling requirements, to reduce inertial characteristics, and reduce manufacturing costs and amounts of materials needed to form the constrained layer damper 225. However, in another embodiment, the shape of constrained layer damper 225 may be any shape and not directly related to, or based on, the shape of actuator arm 125.

Although only two constrained layer damper 225 shapes are illustrated herein, this is not meant to be, and should not be, construed as a limitation of the shape of constrained layer damper 225, Instead, it should be realized that it would be impossible to provide each and every shape to which constrained layer damper 225 may be formed and the provided examples are merely for purposes of clarity.

Figure 3A:
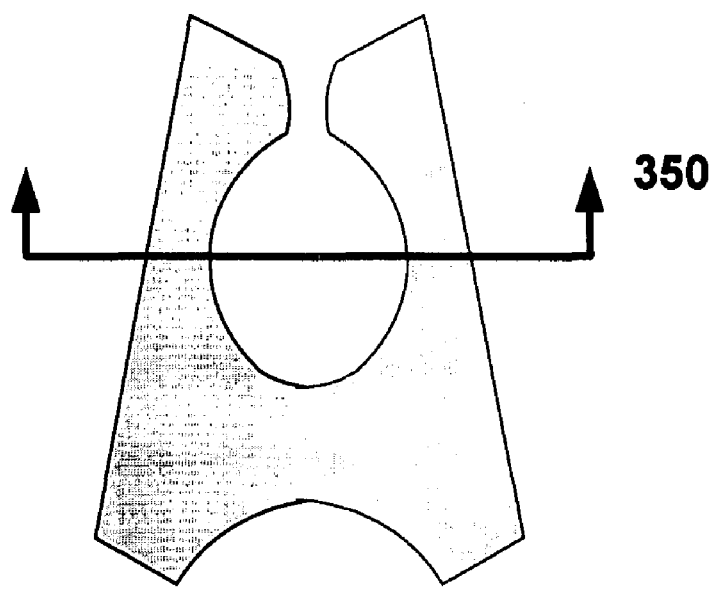
FIG. 3A is a plan view of the non-magnetic constrained layer damper in accordance with one embodiment of the present invention.

With reference now to FIG. 3A, a plan view of constrained layer damper 225 is shown in accordance with one embodiment of the present invention. In one embodiment, constrained layer damper 225 of FIG. 3A is shaped to form-fit at least a portion of the actuator arm 125 of FIGS. 2A-2C. In other words, the shape of constrained layer damper 225 follows the shape of actuator arm 125 to maximize the damping effectiveness of constrained layer damper 225. In another embodiment, the shape of constrained layer damper 225 may be somewhat smaller than, but still follow the shape of, actuator arm 125 to account for dimensional tolerances or to accommodate manufacturing tooling requirements. In yet another embodiment, the shape of constrained layer damper 225 may be any shape and not directly related to, or based on, the shape of actuator arm 125.

Figure 3B:
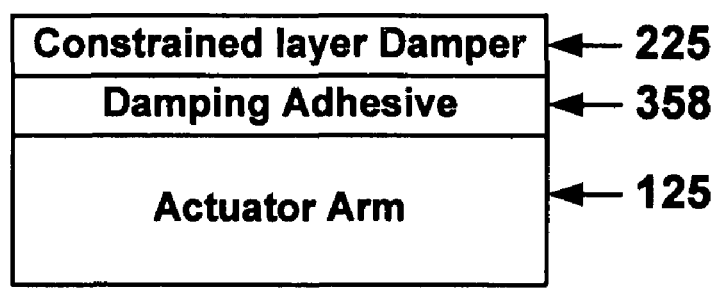
FIG. 3B is a cross section view of constrained layer damper coupled with an actuator in accordance with one embodiment of the present invention

Referring now to FIG. 3B, a cross section view of constrained layer damper 225 coupled with an actuator 125 is shown in accordance with one embodiment of the present invention. In stack 350, constrained layer damper 225 is coupled to the actuator arm 125 via a damping adhesive 358. In one embodiment, the constrained layer damper 225 is formed from Stainless Steel.

However, the present technology is not limited to Stainless Steel. For example, either or both the first damper 225t and the second damper 225b may be formed from other materials such as Nickel plated Aluminum, composite material, non-magnetic material, layered materials not including an elastic layer between the layers and the like. In addition, there may be instances when the first damper 225t is formed of a first material and the second damper 225b is formed of a second material different from said first material. For example, the first material may differ from the second material in composition, weight, flexibility, manufacture, and the like. In one embodiment, damping adhesive 358 is used to couple the first damper 225t and second damper 225b with the actuator arm 125.

Referring now to FIG. 4, a flowchart of a method for utilizing outer arm constrained layer dampers to improve actuator dynamics is shown in accordance with one embodiment of the present invention. As described herein, the ability to utilize outer arm constrained layer dampers for a multi-platter hard disk drive to reduce vibration modes allows a HDD to utilize tighter TPI without requiring significant tightening of the actuator tolerances. In so doing, significant manufacturing costs can be realized.

With reference now to 402 of FIG. 4 and to FIG. 2A, one embodiment receives an actuator 120 including a plurality of suspensions arms 125 for reaching over a disk pack. In one embodiment, the plurality of suspension arms 125 in the actuator comb 212 are formed such that a dominance of the vibration modes associated with the actuator comb 212 suspension arms 125 are associated with the top suspension arm 125a and the bottom suspension arm 125d. As such, by damping the vibration modes at the outer suspension arms 125a and 125d, vibration modes across the entire actuator comb 212 are significantly dampened.

Referring now to 404 of FIG. 4 and to FIG. 2A, one embodiment couples only a first damper 225t and a second damper 225b to the plurality of suspension arms 125, wherein the first damper 225t is coupled with an outside (or inside) portion of a top suspension arm 125a of the plurality of suspensions arms and the second damper 225b is coupled with an outside (or inside) portion of a bottom suspension arm 125d of the plurality of suspensions arms 125.

In one embodiment, the first damper 225t is formed to approximate a portion of the shape of the surface of the top suspension arm 125a. In addition, the second damper 225b is formed to approximate a portion of the shape of the surface of the bottom suspension arm 125d. However, in another embodiment, the first damper 225t is formed to approximate the entire shape of the surface of the top suspension arm 125a. In addition, the second damper 225b is formed to approximate a portion of the entire shape of the surface of the bottom suspension arm 125d Moreover, in yet another embodiment, the first 225t and second damper 225b may be formed in a shape that does not approximate any or all of the shape of the surface of the suspension arm. For example, the first damper 225t and second damper 225b may be a geometric shape that is not directly related to the shape of a suspension arm. In another embodiment, the first damper 225t and the second damper 225b may be a non-geometric shape that is not directly related to the shape of a suspension arm.

As described herein at FIG. 3B, in one embodiment, the first damper 225t and the second damper 225b may be formed from Stainless Steel. However, the present technology is not limited to Stainless Steel. For example, both the first damper 225t and the second damper 225b may be formed from other materials such as Nickel plated Aluminum, composite material, non-magnetic material, layered materials not including an elastic layer between the layers and the like. In one embodiment, damping adhesive 358 is used to couple the first damper 225t and second damper 225b with the actuator arm 125.

With reference now to 406 of FIG. 4 and to FIG. 2B, one embodiment utilizes the first damper 225t and the second damper 225b to damp vibration modes for the plurality of suspension arms 125 thereby improving actuator 120 dynamics.

Basically, the constrained layer dampers 225 mounted on the outside suspension arms 125 work by dissipating the strain energy in the vibration modes of interest (arm torsion, arm sway, arm bending) into heat in the damping polymer. The stainless steel substrate (SUS3O4), or other materials provided herein, acts as a constraining layer for the viscoelastic damping polymer (bonded to the substrate, the outer arms in this case) which undergoes shear deformation when the arms are vibrating in their natural modes. The effectiveness of damping depends on the degree of shear induced in the damping polymer by the specific vibration mode (function of mode shape), the thicknesses, elastic storage & loss moduli of the constraining layer and damping polymer and the frequency of the mode and the operating temperature of the HDD.

Thus, embodiments of the present invention provide a method and apparatus for utilizing outer arm constrained layer dampers to improve actuator dynamics in a hard disk drive. Furthermore, embodiments described herein provide a larger available area for damper application. That is, because in one embodiment where the dampers are applied on only the outer surfaces of the outer arms, the outer profile of the comb barrel does not place any limits on the extent of the damper (e.g., towards the comb bore). Additionally, Arm dampers are an effective counter-measure against carriage to carriage variability of arm-sway and arm-torsion mode gains and frequencies (fallout from machining/assembly tolerances). They also help reduce RTV and NRRO associated with arm modes (Arm sway, Arm torsion, Arm bending). Moreover, the present technology has a lower material cost of dampers since only two are utilized. In addition, there is a lower manufacturing tooling cost because in one embodiment described herein the dampers are applied on the outer surfaces of the outer arms instead of in a number of locations. Furthermore, subsequent inspection/QA is also easier.

Furthermore, a reduced takt time is realized. That is, because the assembly of the dampers to the suspension arm is a sequential operation, the takt time is proportional to the number of arm-dampers used. This becomes crucial for the ability of the carriage vendor to deliver huge volumes during mass production.

In addition, the risks from delamination and outgasssing are lower because the risks from delamination and outgassing are proportional to the number of dampers used. At the same time, the inertia penalty is kept to a minimum with the use of just 2 arm-dampers. Moreover, unlike when applying dampers on all the arms, which destroys dynamic symmetry with respect to the coil mid-plane, the symmetry is preserved in the present technology. In addition, the benefits described herein are realized with minimal modification to the overall HDD manufacturing process in general and to the actuator structure manufacturing process in particular.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for utilizing outer arm constrained layer dampers to improve actuator dynamics, said method comprising:
   receiving an actuator comprising a plurality of suspensions arms for reaching over a disk pack;
   coupling only a first damper and a second damper to said plurality of suspension arms, wherein said first damper is coupled with a portion of a top suspension arm of said plurality of suspensions arms and said second damper is coupled with a portion of a bottom suspension arm of said plurality of suspensions arms; and
   utilizing said first damper and said second damper to damp vibration modes for said plurality of suspension arms thereby improving actuator dynamics.

2. The method of claim 1 further comprising:
   forming said plurality of suspension arms such that a dominance of said vibration modes are associated with said top suspension arm and said bottom suspension arm.

3. The method of claim 1 further comprising:
   forming said first damper to approximate a portion of the shape of said surface of said top suspension arm; and
   forming said second damper to approximate a portion of the shape of said surface of said bottom suspension arm.

4. The method of claim 1 further comprising:
   forming said first damper to approximate the entire shape of said surface of said top suspension arm; and
   forming said second damper to approximate the entire shape of said surface of said bottom suspension arm.

5. The method of claim 1 further comprising:
   forming said first damper and said second damper from stainless steel.

6. The method of claim 1 further comprising:
   forming said first damper and said second damper from Nickel plated Aluminum.

7. The method of claim 1 further comprising:
   coupling said first damper with an outside or an inside portion of said top suspension arm; and coupling said second damper with an outside or an inside portion of said bottom suspension arm.

8. A hard disk drive comprising:

a housing;

a disk pack mounted to the housing and having a plurality of disks that are rotatable relative to the housing;

an actuator coupled to said housing, said actuator comprising a plurality of suspensions arms for reaching over the plurality of disks;

a first damper coupled with a portion of a top suspension arm of said plurality of suspensions arms, said first damper for damping vibration modes of said top suspension arm; and a second damper coupled with a portion of a bottom suspension arm of said plurality of suspensions arms, said second damper for damping vibration modes of said bottom suspension arm.

9. The hard disk drive of claim 8 wherein said plurality of suspension arms are formed such that a dominance of said vibration modes are associated with said top suspension arm and said bottom suspension arm.

10. The hard disk drive of claim 8 wherein said first damper and said second damper are formed to approximate a portion of the shape of the surface of said top suspension arm and said bottom suspension arm respectively.

11. The hard disk drive of claim 8 wherein said first damper and said second damper are formed from stainless steel.

12. The hard disk drive of claim 8 wherein said first damper is coupled with an outside or an inside portion of said top suspension arm and said second damper is coupled with an outside or an inside portion of said bottom suspension arm.

13. The hard disk drive of claim 8 wherein said first damper and said second damper are formed from composite material.

14. The hard disk drive of claim 8 wherein a damping adhesive is utilized for coupling said first damper and said second damper with the surface of said top suspension arm and said bottom suspension arm respectively.

15. A top and bottom damper for an actuator suspension arm comb comprising:

a housing;

a disk pack mounted to the housing and having a plurality of disks that are rotatable relative to the housing, the disk pack defining an axis of rotation and a radial direction relative to the axis;

an actuator coupled to said housing, said actuator comprising a plurality of suspensions arms for reaching over the disk pack, said plurality of suspension arms having only two dampers associated therewith;

a first damper coupled with a portion of a top suspension arm of said plurality of suspensions arms, said first damper formed to approximate a portion of the shape of said surface of said top suspension arm, said first damper for damping vibration modes associated with deformation of said top suspension arm; and a second damper coupled with a portion of a bottom suspension arm of said plurality of suspensions arms, said second damper formed to approximate a portion of the shape of said surface of said bottom suspension arm, said second damper for damping vibration modes associated with deformation of said bottom suspension arm.

16. The top and bottom damper for an actuator suspension arm comb of claim 15 wherein said first damper is formed to approximate the entire shape of said surface of said top suspension arm.

17. The top and bottom damper for an actuator suspension arm comb of claim 15 wherein said second damper is formed to approximate the entire shape of said surface of said bottom suspension arm.

18. The top and bottom damper for an actuator suspension arm comb of claim 15 wherein said first damper and said second damper are formed from Stainless Steel.

19. The top and bottom damper for an actuator suspension arm comb of claim 15 wherein said first damper and said second damper are formed from a layer of Aluminum between two layers of Nickel without providing an elastic layer between said layer of Aluminum and said two layers of Nickel.

20. The top and bottom damper for an actuator suspension arm comb of claim 15 wherein said first damper is coupled with an outside or an inside portion of said top suspension arm and said second damper is coupled with an outside or an inside portion of said bottom suspension arm.

\* \* \* \* \*

UNITED STATES PATENT AND TRADEMARK OFFICE
CERTIFICATE OF CORRECTION

| | |
|---|---|
| PATENT NO. | : 7,859,795 B2 |
| APPLICATION NO. | : 11/824166 |
| DATED | : December 28, 2010 |
| INVENTOR(S) | : Jeffrey Kerner et al. |

It is certified that error appears in the above-identified patent and that said Letters Patent is hereby corrected as shown below:

In the drawings, Sheet 3, Figure 2A, reference numeral "225A" should read -- 225T --.

In the drawings, Sheet 3, Figure 2B, reference numeral "255" should read -- 225 --.

In the drawings, Sheet 3, Figure 2C, reference numeral "255" should read -- 225 --.

Signed and Sealed this
Thirty-first Day of January, 2012

David J. Kappos
*Director of the United States Patent and Trademark Office*